United States Patent Office 3,341,601
Patented Sept. 12, 1967

3,341,601
PREPARATION OF DIELS-ALDER ADDUCTS
Joseph Kern Mertzweiller, Baton Rouge, La., assignor to Esso Research and Engineering Company, a corporation of Delaware
No Drawing. Filed Apr. 25, 1962, Ser. No. 189,990
12 Claims. (Cl. 260—586)

This invention relates to a process for producing Diels-Alder adducts of conjugated dienes and carbonyl compounds. More particularly, the invention relates to a process wherein Diels-Alder adducts are produced by contacting a reaction mixture comprising a conjugated diene and a carbonyl compound having at least two alpha hydrogen atoms with a condensation-dehydration catalyst at elevated temperatures.

The Diels-Alder synthesis is a well-known method of forming six-membered ring structures from conjugated dienic compounds. The synthesis involves the 1,4-addition of the dienic compound to a second component having an ethylenic linkage next adjacent to a carbonyl function. The 1 and 4 carbon atoms of the diene, for example, butadiene, become bonded to the ethylenic carbon atoms of the second component to produce an unsaturated cyclic structure as illustrated in the following equation:

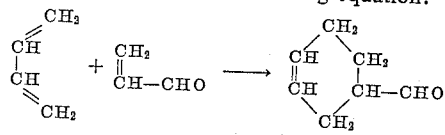

The six-membered cyclic products of the reaction, generally known as Diels-Alder adducts, are valuable intermediates from which a variety of useful materials can be made. For example, the double bond of the ring undergoes typical addition reactions of the ethylenic bond to yield di- and tri-functionally substituted cyclohexanes. The ring double bond can also be oxonated by standard procedures to produce dialdehydes and the corresponding dialcohols. Alternatively, the adducts can be oxidized with oxygen-containing gases or other known oxidizing agents to yield tricarboxylic acids. These acids find utility in the production of highly cross-linked alkyd resins, or upon esterification, provide plasticizers for polymeric resins. The dialcohols can also be esterified to provide plasticizers for the same purpose. Many other uses to which the Diels-Alder adducts or products derivable therefrom may be put will be readily apparent to those skilled in the art.

It has now been surprisingly found that Diels-Alder adducts are readily formed by contacting a reaction mixture containing a conjugated diene and a saturated carbonyl compound having at least two alpha hydrogen atoms with a condensation-dehydration catalyst at elevated temperatures. While the manner in which Diels-Alder adducts are thereby formed is not known with certainty, it is believed that in the presence of the catalyst, the saturated carbonyl compound aldolizes and dehydrates to form in situ an alpha,beta-ethylenically-unsaturated carbonyl compound which then undergoes the Diels-Alder reaction with the conjugated diene. In any event, the present invention provides a process for producing Diels-Alder adducts directly from certain saturated carbonyl compounds, i.e. those having at least two alpha hydrogens, in a single reaction step. Thus, the necessity of first producing and isolating an alpha,beta-unsaturated carbonyl compound before carrying out the Diels-Alder synthesis is avoided. Economic advantages inherent in a single step process as compared to a two step process are, of course, realized by producing Diels-Alder adducts in accordance with the present invention. Another of the many other advantages of the present process is the ease with which the unreacted carbonyl compounds and conjugated dienes are separated from the adducts for recycling.

A wide choice of diene reactants may be used in the present process, there being no theoretical limit as to type or size. It is necessary only that the diene possess the conjugated ethylenically unsaturated system required in the customary Diels-Alder synthesis. Preferably, however, the diene reactant will comprise a conjugated diolefin having from 4 to about 10 carbon atoms. The aliphatic $C_4$ to $C_6$ conjugated diolefins such as butadiene, isoprene, piperylene, cyclopentadiene and methylcyclopentadiene are especially preferred reactants.

The carbonyl component of the reaction mixture may comprise a single carbonyl compound or a mixture of carbonyl compounds. Either aldehydes or ketones are suitable; however, because of their greater reactivity, aldehydes are preferred. In order to function in the intended manner, at least one carbonyl compound must be present which has two hydrogen atoms on the carbon atom next adjacent the carbonyl group, i.e. alpha hydrogens. Thus, the carbonyl component of the reaction mixture may consist of either a single carbonyl compound capable of undergoing aldolization and dehydration to form an alpha,beta-ethylenically-unsaturated carbonyl compound or a combination of carbonyl compounds which can form a mixed aldol product capable of losing water to form an alpha,beta-ethylenically unsaturated carbonyl compound. Practical considerations such as availability and cost make the $C_2$ to $C_{10}$ saturated aliphatic aldehydes and ketones preferred to those of higher molecular weight, although higher carbonyl compounds can be used if so desired. Illustrative of aldehydes and ketones having the required alpha hydrogens are acetaldehyde, propionaldehyde, n-butyraldehyde, n-pentanal, n-hexanal, n-octanal, n-decanal, acetone, methyl ethyl ketone, methyl propyl ketone, methyl isopropyl ketone, diethyl ketone, ethyl butyl ketone and the like.

An especially suitable mixture of carbonyl compounds for producing Diels-Alder adducts in accordance with this invention is one containing formaldehyde in addition to the alpha hydrogen-containing $C_2$ to $C_{10}$ aldehyde or ketone. Any source of formaldehyde may be used; however, aqueous solutions containing from about 10 to 40 wt. percent formaldehyde, preferably 20 to 40 wt. percent, are considered, for the purposes of this invention, to be a superior form of formaldehyde. Generally, the amount of formaldehyde employed will be that sufficient to provide about a 1:1 molar ratio of formaldehyde to alpha hydrogen-containing carbonyl compound, although either lesser or greater amounts can be used.

Stoichiometrically, the process of the invention involves the reaction of one mole of conjugated diene with two moles of carbonyl components, for example:

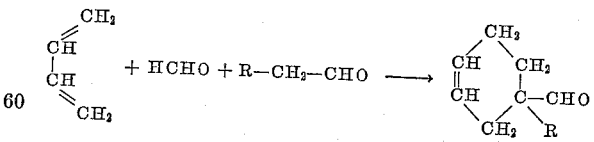

Hence, reaction mixtures containing a molar ratio of diene to carbonyl components of about 0.5:1 are suitable. The process is not limited to reaction mixtures containing a stoichiometric quantity of reactants, however, and either lesser or greater amounts of diene can be used. In general, the desirable molar ratios of diene to carbonyl components range from about 0.3:1 to 10:1 with ratios of about 0.3:1 to 2:1 being preferred. The use of excess diene appears to have certain advantages when the reaction mixture contains aqueous formaldehyde. It is believed that the excess diene acts as a diluent or scavenger for the unsaturated carbonyl compound which presumably is generated in situ, and serves to more rapidly remove this reactive intermediate from the aqueous phase before additional condensation to higher molecular weight products can occur.

In addition to the diene and carbonyl components, the reaction mixture contains a condensation-dehydration catalyst. While any catalyst may be used which promotes the aldol condensation of carbonyl compounds and the dehydration of the resultant aldol, the carboxylic acid salts of metals of Group II having atomic numbers of 12 to 38 and of certain transition metals of Group VIII have been found to be particularly effective. For example, the metal cationic portion of the catalyst can be magnesium, calcium, zinc, strontium, iron or cobalt. The Group II metal salts, especially magnesium salts, are preferred. When aqueous formaldehyde is employed as a reactant, the anionic portion of the catalyst is preferably a lower, i.e. $C_1$ to $C_4$, aliphatic carboxylic acid residue. The acetate salts are particularly suitable. Of course, in certain reactions in which it is desired to condense a higher molecular weight aldehyde, for example, an aldehyde of limited water solubility, it may be advantageous to use a higher molecular weight carboxylic acid salt of the catalytically active metals. Salts such as the tallates, oleates, stearates or sulfonates are satisfactory. Among other known catalysts which can be used in the present process are the mixed oxides of magnesium, molybdenum and zinc, more fully described in U.S. Patent No. 2,888,396, to which reference is hereby made.

The amount of metal salt catalyst employed is not critical, and from 0.01 to 0.1 molar concentrations (with respect to the total volume of the reaction mixture) of the catalyst are generally used. Best results are obtained with catalyst concentrations of about 0.05 to 0.1 molar.

The process of the invention is carried out at elevated temperature. Since the rate of reaction is highly dependent on the temperature employed and, also, on the reactivity of the particular reactants, a wide range of temperatures and reaction times is used. Generally, it has been found advantageous to carry out the reaction at a sufficiently high temperature so that the Diels-Alder adduct is formed in a minimum time. Temperatures of from about 100° to 250° C. and reaction times of from about 1 minute to 3 hours have been found to be suitable; however, it is preferred to carry out the reaction at temperatures between 150° to 200° C. and for reaction times of about 10 to 60 minutes.

The reactions which occur during the process of this invention take place in the liquid phase. Therefore, it is necessary to employ pressures sufficiently high to maintain a liquid phase reaction mixture. The autogenous pressure of the reaction mixture is generally satisfactory. Higher pressures may, of course, be used; but this has not been found to be necessary.

In order to obtain the best results, it has also been found to be advantageous to have water present in the reaction system in addition to that generated during the course of the reaction. This additional water may be supplied either with the carbonyl reactant, e.g. aqueous formaldehyde, or the catalyst may be introduced into the reaction mixture either dissolved or otherwise dispersed in water. Any other means of adding water may also be be used. The amount of water added to the reaction mixture is generally between about 5 and 50 wt. percent of the carbonyl components, with amounts ranging from about 10 to 30 wt. percent being preferred.

The following examples will further serve to illustrate the process of the invention and its advantages.

Example 1

A 300 cc. stirred autoclave was charged with 28.9 g. propionaldehyde and 44.6 g. aqueous (37%) formaldehyde solution. The system was purged with nitrogen and about 40 g. of butadiene was pressured in from an auxiliary vessel. The autoclave was heated to 150° C., the pressure rising to 600 p.s.i.g. A catalyst solution consisting of 1.4 g. magnesium acetate (tetrahydrate) dissolved in 5 cc. water was pressured into the system. The temperature was increased to 175° C., the pressure reaching a maximum of 975 p.s.i.g. The system was held at 175° C. for 20 minutes; the pressure decreased to 830 p.s.i.g. during this period. The autoclave was cooled to room temperature and vented slowly through a dry ice trap. About 30 g. of butadiene was collected in the trap. The contents of the autoclave consisted of a lower aqueous layer (44.2 g.) and an upper nonaqueous layer (47.3 g.). Distillation of the aqueous layer gave 4 g. of product, boiling between 50° and 90° C. and having the following composition:

|  | Percent |
|---|---|
| Water+Formaldehyde | 42 |
| Propionaldehyde | 49 |
| Methacrolein | 5 |
| Heavier products | 4 |

The nonaqueous layer was analyzed by distillation, vapor chromatography and infrared techniques and had the following composition:

|  | Percent |
|---|---|
| Butadiene+Formaldehyde | 24 |
| Propionaldehyde | 15 |
| Methacrolein | 7 |
| Vinylcyclohexene | 22 |
| 4-methyl-4-formylcyclohexene | 28 |
| Heavier products | 4 |

The conversion of propionaldehyde was 70%. Selectivity to methacrolein and its adduct was 55%. Recovery of methacrolein in the form of the adduct was 69%. The yield of adduct (based on propionaldehyde charged to the autoclave) was 23%.

Example 2

A 3-liter shaker autoclave was charged with 405 g. propionaldehyde and 770 g. aqueous (37%) formaldehyde. A catalyst consisting of 16.5 g. magnesium acetate in 50 cc. water was added. The autoclave was purged and 294 g. butadiene pressured in. The contents of the autoclave were heated to 175° C. and held for 30 minutes. The system was cooled to room temperature and depressured slowly. The over-all recovery of liquid products was:

|  | Grams |
|---|---|
| Upper nonaqueous layer | 589.5 |
| Lower aqueous layer | 314.7 |

Analysis of the upper layer was as follows:

|  | Percent |
|---|---|
| Butadiene+formaldehyde | 13 |
| Propionaldehyde | 20 |
| Methacrolein | 3 |
| Vinylcyclohexene | 16 |
| 4-methyl-4-formylcyclohexene | 42 |
| Heavier products | 6 |

Selectivity to methacrolein and its adduct was 58%. Recovery of methacrolein in the form of the adduct was 88%. The yield of adduct (based on moles of butadiene charged to the autoclave) was 37%.

Example 3

Runs made under the same conditions described above except that n-octane was used in place of butadiene gave 45 to 48% selectivity to methacrolein. This result illustrates the decreased selectivity to methacrolein when butadiene is absent from the reaction mixture.

Example 4

The 300 cc. autoclave was charged with 30 g. acetaldehyde, 55 g. aqueous formaldehyde (37%), 50 g. butadiene and 2 g. magnesium acetate (tetrahydrate). The temperature was increased to 150° C. and the pressure increased to a maximum of 600 p.s.i.g. After 20 minutes, the pressure had dropped 500 p.s.i.g. and the reactor was cooled to room temperature and most of the excess butadiene and acetaldehyde (about 43. g.) was vented off. The liquid product consisted of 63.3 g. of a lower (aqueous) phase and 33.6 g. of an upper (nonaqueous) phase. Work-up of the aqueous phase by distillation and extraction accounted for the following composition:

| | Percent |
|---|---|
| Acetaldehyde | 12 |
| Water | 79 |
| Heavy H$_2$O soluble products | 9 |

The upper layer had the following approximate composition:

| | Percent |
|---|---|
| Butadiene | 7 |
| Acetaldehyde | 14 |
| Acrolein | 4 |
| Vinylcyclohexene | 8 |
| 4-formyl-cyclohexene | 47 |
| Heavy products | 20 |

The yield of acrolein and 4-formyl-cyclohexene was about 45 mole percent based on acetaldehyde converted. About 85% of the product was in the form of the butadiene adduct. The yield of adduct (based on acetaldehyde charged to the autoclave) was about 22%.

*Example 5*

A control run without butadiene addition but similar to Example 4 gave less than 5 mole percent yield of acrolein and greater than 50% yield of heavy unidentified products. These data again serve to illustrate the importance of having the diene reactant present during the formation of the reactive alpha,beta-unsaturated carbonyl intermediate.

*Example 6*

A one gallon stirred autoclave was charged with 629 g. butadiene, 671 g. acetaldehyde, 530 g. water and 19 g. of magnesium acetate (tetrahydrate). The mixture was stirred at 150° C. for 4½ hours. After cooling and depressuring, an upper, nonaqueous layer amounting to 1031 g. was recovered. This upper layer had the following composition:

| | Percent |
|---|---|
| Butadiene+acetaldehyde | 16.3 |
| Crotonaldehyde | 10.6 |
| Vinylcyclohexene | 32.8 |
| 4-formyl-5-methylcyclohexene | 26.6 |
| Unidentified and heavy products | 13.7 |

The yield of adduct (based on acetaldehyde charged to the autoclave) was 29%. A 21% yield of crotonaldehyde was also obtained, along with 53% yield of vinylcyclohexene (on butadiene).

*Example 7*

A feed consisting of a 1/1/1 mole ratio of (aqueous) formaldehyde-acetaldehyde/butadiene was passed over a solid catalyst consisting of mixed oxides of magnesium, zinc and molybdenum deposited on alumina. The temperature was 175° C. and the feed rate was 4 volumes of total feed per volume of catalyst per hour. The pressure was the vapor pressure of the reaction mixture at the specified temperature (autogenous pressure). The separated product consisted of two liquid phases:

| | Percent |
|---|---|
| Upper phase (nonaqueous) | 16.4 |
| Lower phase (aqueous) | 83.6 |

The nonaqueous phase analyzed as follows:

| | Percent |
|---|---|
| Formaldehyde+acetaldehyde | 31.9 |
| 4-formyl-cyclohexane | 36.2 |
| Crotonaldehyde | 9.6 |
| Vinylcyclohexene | 4.3 |

Aldehyde conversion was 9.2% with a selectivity to the adduct of 73%.

It will be appreciated that the foregoing description is for purposes of illustration and is not to be construed as limiting the invention. Many modifications which do not depart from the spirit of the invention will be apparent to those skilled in the art. The invention is therefore to be limited solely by the scope of the appended claims.

What is claimed is:

1. A process for directly producing a Diels-Alder adduct which comprises contacting a liquid reaction mixture containing a C$_4$–C$_{10}$ conjugated diene and a C$_2$ to C$_{10}$ saturated aliphatic carbonyl compound having at least two alpha hydrogen atoms with an aldo condensation-dehydration catalyst comprising an aliphatic carboxylic acid salt of a metal selected from the group consisting of magnesium, calcium, zinc, strontium, iron and cobalt at a temperature between 100° and 250° C.

2. The process of claim 1 wherein said carbonyl compound is a C$_2$ to C$_{10}$ aldehyde.

3. The process of claim 1 wherein said carbonyl compound is a C$_2$ to C$_{10}$ ketone.

4. A process for directly preparing a Diels-Alder adduct which comprises contacting a liquid reaction mixture containing a C$_4$ to C$_{10}$ conjugated diolefin, formaldehyde and a C$_2$ to C$_{10}$ saturated aliphatic carbonyl compound having at least two alpha hydrogen atoms and selected from the group consisting of aldehydes and ketones with an aldol condensation-dehydration catalyst comprising an aliphatic carboxylic acid salt of a Group II metal having an atomic number of from 12 to 38 at a temperature between 100° and 250° C.

5. The process of claim 4 wherein said formaldehyde is aqueous formaldehyde.

6. The process of claim 4 wherein said catalyst is a lower aliphatic carboxylic acid salt of magnesium.

7. A process for directly producing a Diels-Alder adduct which comprises forming in a pressure zone a liquid reaction mixture containing a C$_4$ to C$_6$ conjugated diolefin, an aqueous formaldehyde solution and a C$_2$ to C$_4$ saturated aliphatic aldehyde having at least two alpha hydrogen atoms, and contacting said reaction mixture in said pressure zone with a catalyst comprising a magnesium salt of a lower aliphatic carboxylic acid at a temperature between 100° and 250° C. and at a pressure sufficient to maintain at least part of each component of said reaction mixture in the liquid phase.

8. The process of claim 7 wherein said catalyst is magnesium acetate.

9. The process of claim 7 wherein said diolefin is 1,3-butadiene.

10. The process of claim 7 wherein said C$_2$ to C$_4$ aldehyde is acetaldehyde.

11. The process of claim 7 wherein said C$_2$ to C$_4$ aldehyde is propionaldehyde.

12. The process of claim 7 wherein said pressure is the autogenous pressure of the reaction mixture.

References Cited

UNITED STATES PATENTS

| 3,036,091 | 5/1962 | England | 260—586 |
| 3,060,236 | 10/1962 | Kollar et al. | 260—586 |

FOREIGN PATENTS

| 309,911 | 7/1930 | Great Britain. |
| 478,621 | 11/1951 | Canada. |

LEON ZITVER, *Primary Examiner.*

J. J. SETELIK, B. HELFIN, *Assistant Examiners.*